(12) United States Patent
Chen et al.

(10) Patent No.: US 7,162,562 B2
(45) Date of Patent: Jan. 9, 2007

(54) PORTABLE ELECTRONIC SYSTEM AND ACCESSING METHOD THEREOF

(75) Inventors: Ren-Peng Chen, Shindian (TW);
Wan-Hsieh Liu, Shindian (TW);
Shih-Ming Hsu, Shindian (TW);
Tsung-Pao Kuan, Shindian (TW);
Chi-Feng Lee, Shindian (TW)

(73) Assignee: High Tech Computer Corp., Taoyuan (TW)

( * ) Notice: Subject to any disclaimer, the term of this patent is extended or adjusted under 35 U.S.C. 154(b) by 288 days.

(21) Appl. No.: 10/858,676

(22) Filed: Jun. 2, 2004

(65) Prior Publication Data
US 2005/0198427 A1    Sep. 8, 2005

(30) Foreign Application Priority Data
Aug. 28, 2003   (TW) .............................. 92123841 A

(51) Int. Cl.
*G06F 13/00* (2006.01)
(52) U.S. Cl. .......................................... 710/303; 710/2
(58) Field of Classification Search ................ 710/303, 710/2, 313; 341/101
See application file for complete search history.

(56) References Cited

U.S. PATENT DOCUMENTS 6,088,752 A * 7/2000 Ahern .......................... 710/303
6,567,881 B1 * 5/2003 Mojaver et al. ............. 710/313
6,950,889 B1 * 9/2005 Ishida et al. .................. 710/65

FOREIGN PATENT DOCUMENTS

CN    1318171    10/2001

\* cited by examiner

*Primary Examiner*—Rehana Perveen
*Assistant Examiner*—Clifford Knoll
(74) *Attorney, Agent, or Firm*—Thomas, Kayden, Horstemeyer & Risley

(57) ABSTRACT

A portable electronic device equipped with multi-function high speed bus and the relevant method is provided in the invention. The portable electronic device includes a main electronic apparatus for connecting to an expansion device through an expansion pack. The central processing unit (CPU) of the main electronic apparatus is connected to the host controller by a first system bus. The host controller is connected to the expansion pack by a multi-function high speed bus. The first system bus is electrically connected to the CPU and includes P signal lines; the multi-function high speed bus includes Q signal lines, where Q<P. The host controller bridges the signals from P signal lines of the first system bus and the signals from the Q signal lines of the multi-function high speed bus. The host controller receives the signals from the first system bus in M clock cycles and outputs the signals to the multi-function high speed bus in N clock cycles, where N>M.

25 Claims, 5 Drawing Sheets

| Command Address Cycle ||||
|---|---|---|---|
| CLK | BST | BRDY | CAD[7...0] |
| 0 | 0 | 0 | TS |
| 1 | 1 | 0 | M7 M6 M5 M4 M3 M2 M1 M0 |
| 2 | 1 | 0 | BE3 BE2 BE1 BE0 RS1 RS0 A25 A24 |
| 3 | 1 | 0 | A23 A22 A21 A20 A19 A18 A17 A16 |
| 4 | 1 | 0 | A15 A14 A13 A12 A11 A10 A9 A8 |
| 5 | 1 | 0 | A7 A6 A5 A4 A3 A2 A1 A0 |

FIG. 2A

| Data Reading Cycle ||||
|---|---|---|---|
| CLK | BST | BRDY | CAD[7...0] |
| 6 | 0 | 0 | TS |
| 7 | 0 | 0 | TS |
| 8 | 0 | 0 | TS |
| 9 | 0 | 1 | D7 D6 D5 D4 D3 D2 D1 D0 |
| 10 | 0 | 1 | D15 D14 D13 D12 D11 D10 D9 D8 |
| 11 | 0 | 1 | D23 D22 D21 D20 D19 D18 D17 D16 |
| 12 | 0 | 1 | D31 D30 D29 D28 D27 D26 D25 D24 |
| 13 | 0 | 0 | TS |

FIG. 2B

| Data Writing Cycle ||||
|---|---|---|---|
| Cycle | BST | BRDY | CAD7-0 |
| 6 | 0 | 0 | D7 D6 D5 D4 D3 D2 D1 D0 |
| 7 | 0 | 0 | D15 D14 D13 D12 D11 D10 D9 D8 |
| 8 | 0 | 0 | D23 D22 D21 D20 D19 D18 D17 D16 |
| 9 | 0 | 0 | D31 D30 D29 D28 D27 D26 D25 D24 |
| 10 | 0 | 0 | TS |
| 11 | 0 | 0 | TS |
| 12 | 0 | 1 | TS |

FIG. 2C

PORTABLE ELECTRONIC SYSTEM AND ACCESSING METHOD THEREOF

This application claims the benefit of Taiwan application Serial No. 92123841, filed Aug. 28, 2003, the subject matter of which is incorporated herein by reference.

BACKGROUND OF THE INVENTION

1. Field of the Invention

The invention relates in general to a portable electronic system, and more particularly to a multi-function high speed bus with less number of pins and the accessing method of the portable electronic system.

2. Description of the Related Art

The advance of technology matures the development of portable electronic devices. For example, portable electronic devices are designed with size decreasing and function increasing. Portable electronic devices, such as mobile phones, personal digital assistants (PDAs), or PDA mobile phones serve to provide communication, information looking up, and entertainment. The busy modern people require more and more readily accessible information, and therefore, portable electronic devices are becoming an indispensable necessity for the life of modern people.

The design of portable electronic device, for example PDA, is usually small and light for easy carrying. Expansion pack is used when other expansion device, such as memory card, network card, or data card, is required. The interface between the electronic device and the expansion pack can be, for example, PCMCIA/CF or variable latency I/O (VLIO). Due to the widespread usage of PDAs, manufactures try to develop different kinds of expansion devices, which adopt PCMCIA/CF interface or VLIO interface, in order to supply expandable function to the users.

However, the size of the connector required by both the VLIO interface and the PCMCIA/CF interface is too large, and does not fit in well with the trend to go smaller and lighter for portable electronic devices. The VLIO interface, which is the interface used by INTEL Xscale processor, includes 8 control lines, 32 data lines, and 26 address lines—there are totally 66 lines required by the VLIO interface, and the size of the connector between the electronic device and the expansion pack is very large. The PCMCIA/CF interface also requires many transmission lines and its connector is very large, too.

SUMMARY OF THE INVENTION

It is therefore an object of the invention to provide a method and apparatus in a portable electronic device. The portable electronic device is equipped with multi-function high speed bus and less number of pins. The system is compatible with existing expansion devices.

The invention achieves one of the above-identified objects by providing a portable electronic device equipped with multi-function high speed bus. The portable electronic device includes a main electronic apparatus for connecting to an expansion device through an expansion pack. The main electronic apparatus includes a central processing unit (CPU), a first system bus, a host controller, and a multi-function high speed (MFHS) bus. The first system bus is electrically connected to the CPU and has P signal lines, where P is a positive integer. The MFHS bus includes Q signal lines, where Q is a positive integer and Q<P. The host controller communicates with the CPU through the first system bus, and communicates with the expansion pack through the MFHS bus. The host controller bridges the P signals on the first system bus and the Q signals on the MFHS bus. The host controller transmits M clock signals of the first system bus to the MFHS bus in N clock cycles, where N is a positive integer and N>M.

The invention achieves another above-identified object by providing a method which is applied to the above-mentioned portable electronic device. Firstly, the CPU transfers a first command address cycle to the first system bus. The host controller then receives the first command address cycle from the first system bus in M clock cycles. Following that, the host controller transforms the first command address cycle into a second command address cycle and transfers the second command address cycle in N clock cycles through the multi-function high speed bus, thereby the status signal is enabled, where N>M. Thus the client controller is enabled to receive the second command address cycle. The client controller then transforms the second command address cycle into a third command address cycle and the third command address cycle is transferred to the second system bus in K clock cycles. Finally, the second system bus transfers the third command address cycle to the expansion device.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 2A shows the content of the command address cycle of the multi-function high speed bus.

FIG. 2B shows the content of the data reading cycle of the multi-function high speed bus.

FIG. 2C shows the content of the data writing cycle of the multi-function high speed bus.

DETAILED DESCRIPTION OF THE INVENTION

There are a number of transmission lines in the widely used interfaces, such as VLIO or PCMCIA/CF, and hence the size of the connector is large. The conventional interfaces and connector does not fit in well with the trend to go smaller and lighter for portable electronic devices. A bus with less number of pins and is compatible with existing expansion pack is required in order to reduce the size of the connector.

Figure 1:
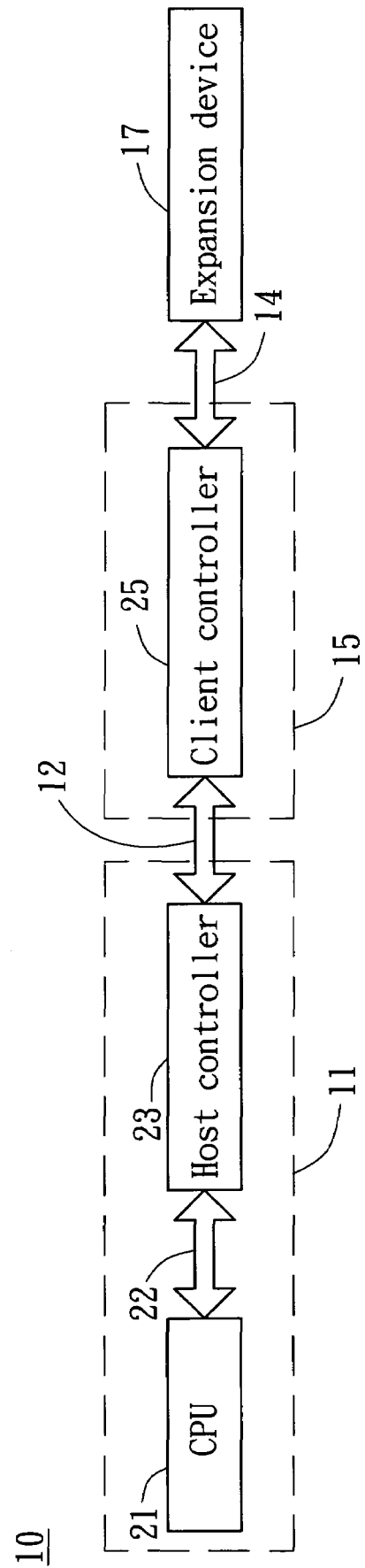
FIG. 1 is a diagram of a portable electronic device according to the preferred embodiment of the invention.

Please refer to FIG. 1 that is a diagram of a portable electronic device according to the preferred embodiment of the invention. The portable electronic device 10 includes an electronic apparatus 11, an expansion pack 15, and an expansion device 17. The electronic apparatus 11 is, for example, a personal digital assistant (PDA). By connecting the expansion pack 15 and the expansion device 17, functions of the expansion device 17 can be added to the electronic apparatus. The expansion device is, for example, a memory card, a data card, or a network card. When the electronic apparatus does not need expanded function, the expansion pack 15 can be detached in order to reduce the size and the weight.

The interface between the electronic apparatus 11 and the expansion pack 15 is a multi-function high speed (MFHS) bus 12. According to the implement of the MFHS bus 12, the number of pins is reduced, and the size of the connector and the portable electronic device 10 are scaled down. The expansion pack 15 is eclectically connected to the expansion device 17 by a system bus interface 14, such as the VLIO interface or the PCMCIA/CF interface. The expansion pack 15 is compatible with existing expansion devices.

The electronic apparatus 11 includes a central process unit (CPU) 21, a system bus 22, and a host controller 23. The CPU 21 connects to the host controller 23 through the system bus 22. The host controller 23 bridges the signals between the system bus 22 and the MFHS bus 12 for communicating between the CPU 21 and the expansion pack 15.

The expansion pack 15 includes a client controller 25. The client controller 25 transmits signals of the MFHS bus 12 to signals of the system bus 14, or transmits the signals of the system bus 14 to the signals of the MFHS bus 12. The CPU 21 communicates with the expansion device 17 through the host controller 23 and the client controller 25. In this embodiment, the system buses 14 and 22 are the same standard, for example the VLIO or the PCMCIA/CF.

The MFHS bus 12 includes a clock signal line CLK, a status signal line BST, a ready signal line BRDY, and 8 content signal lines CAD[7 . . . 0]. The content signal lines CAD[7 . . . 0] transmit control signals, address signals and data signals.

The CPU 21 transfers read cycles or write cycles to perform read or write on the expansion device 17. A read cycle includes a command address cycle and a data reading cycle; a write cycle includes a command address cycle and a data writing cycle. During the write cycle of the CPU 21, the host controller 23 transfers the command address cycle, and then transfers the data writing cycle; the write cycle is completed after the expansion device 17 confirms that the data is written successfully. During the read cycle of the CPU 21, the host controller 23 transfers a command address cycle; the read cycle is completed after the expansion device sends the requested data. Different buses are used to transmit the signals for the read/write cycles mentioned above by different methods due to the different number of transmission lines.

The command address cycle includes a control signal and an address signal. The control signal includes at least an access mode signal, and a byte-enabling signal. The access mode signal represents whether this operation is read or write. The byte-enabling signal is used to control the number of byte of current read/write cycle, and it could be, for example, a byte, a word, a tri-byte, or a double-word. A data reading cycle includes a data signal that is the data sent by the expansion device 17 in reply of the requested from the command address cycle. The data writing cycle includes a data signal which is written in the expansion device 17 by the CPU 21.

The existing VLIO bus or the PCMCIA/CF bus includes more transmission lines to transmit the control signal, the address signal, and the data signal. In these existing buses, the control signal and the address signal of one command address signal is transmitted in one clock cycle. However, the number of pins is reduced according to the invention and one command address cycle is completed in a plurality of clock cycles. Similarly, in existing buses, the data reading cycle and the data writing cycle is transferred in one clock cycle with for example a 24-bit data which would require a plurality of clock cycles for the data reading cycle and data writing cycle of the invention to complete.

FIG. 2A shows the content of the command address cycle of the MFHS bus. When the host controller 23 transmits a signal of the MFHS bus to the client controller 25, the status line BST is enabled, thereby the client controller 25 receives signals from the MFHS bus. In the embodiment, the command address cycle uses 5 clock cycles for transmitting the control signal and the address signal. At clock cycle 0, the transmission is not started, and the content signal lines CAD[7 . . . 0] are tri-stated (TS). At clock cycle 1, the content signal lines CAD[7 . . . 0] are general command signals M[7 . . . 0] which are the command signal. At clock cycle 2, the content signal lines CAD[7 . . . 0] are byte-enabling signals BE[3 . . . 0], reserve signals RS[1 . . . 0], and address sign signals A[25 . . . 24]. At clock cycle 3, the content signals lines CAD[7 . . . 0] are address signals A[23 . . . 16]. At clock cycle 4, the content signal lines CAD[7 . . . 0] are address signals A[15 . . . 8]. At clock cycle 5, the content signal lines CAD[7 . . . 0] are address signals A[7 . . . 0]. This command address cycle is used within a write cycle and a read cycle.

FIG. 2B shows the content of the data reading cycle of the MFHS bus. When the host controller 23 transfers a command address cycle of the read cycle to the client controller 25, it is a waiting status. The client controller 25 transforms the command address cycle and outputs the command address cycle to the expansion device 17. The expansion device 17 then returns the requested data to the client controller 25. The client controller 25 outputs the data reading cycle from the received data by the standard of the MFHS bus. The client controller 25 outputs the data reading cycle and enables the ready signal to acknowledge the host controller 23 that the data in the transmission lines are received. The duration between the host controller transferring the command address cycle and the host controller 23 receiving the data from the client controller 25 depends on the expansion device 17. For example, it is 3 clock cycles (clock cycle 6, 7, and 8) in this embodiment. At clock cycle 9, the content signal lines CAD[7 . . . 0] are data signals D[7 . . . 0]. At clock cycle 10, the content signal lines CAD[7 . . . 0] are data signals D[15 . . . 8]. At clock cycle 11, the content signal lines CAD[7 . . . 0] are data signals D[23 . . . 16]. At clock cycle 12, the content signal lines CAD[7 . . . 0] are data signals D[31 . . . 24]. At clock cycle 13, the transmission of data D is completed and the ready signal line (BRDY) is disabled, the content signal lines CAD[7 . . . 0] are tri-stated (TS).

FIG. 2C shows the content of the data writing cycle of the MFHS bus. When the host controller 23, in clock cycle 1 to 5, outputs the command address cycle of the writing cycle to the client controller 25, it transfers a data writing cycle. At clock cycle 6, the content signal lines CAD[7 . . . 0] are data signals D[7 . . . 0]. At clock cycle 7, the content signal lines CAD[7 . . . 0] are data signals D[15 . . . 8]. At clock cycle 8, the content signal lines CAD[7 . . . 0] are data signals D[23 . . . 16]. At clock cycle 9, the content signal lines CAD[7 . . . 0] are data signals D[31 . . . 24]. After the client controller 25 transforms the data received, the client controller 25 outputs the data to the expansion device 17 and waits for the response from the expansion device 17. The duration of the waiting is, for example, 2 clock cycles, clock cycles 10 and 11. When the expansion device 17 confirms the writing is complete, the expansion device 17 transfers a response to the client controller 25. The client controller 25 enables the ready signal line BRDY of the MFHS bus at clock cycle 12 in order to acknowledge the host controller 23 that the data writing cycle is completed.

Figure 3:
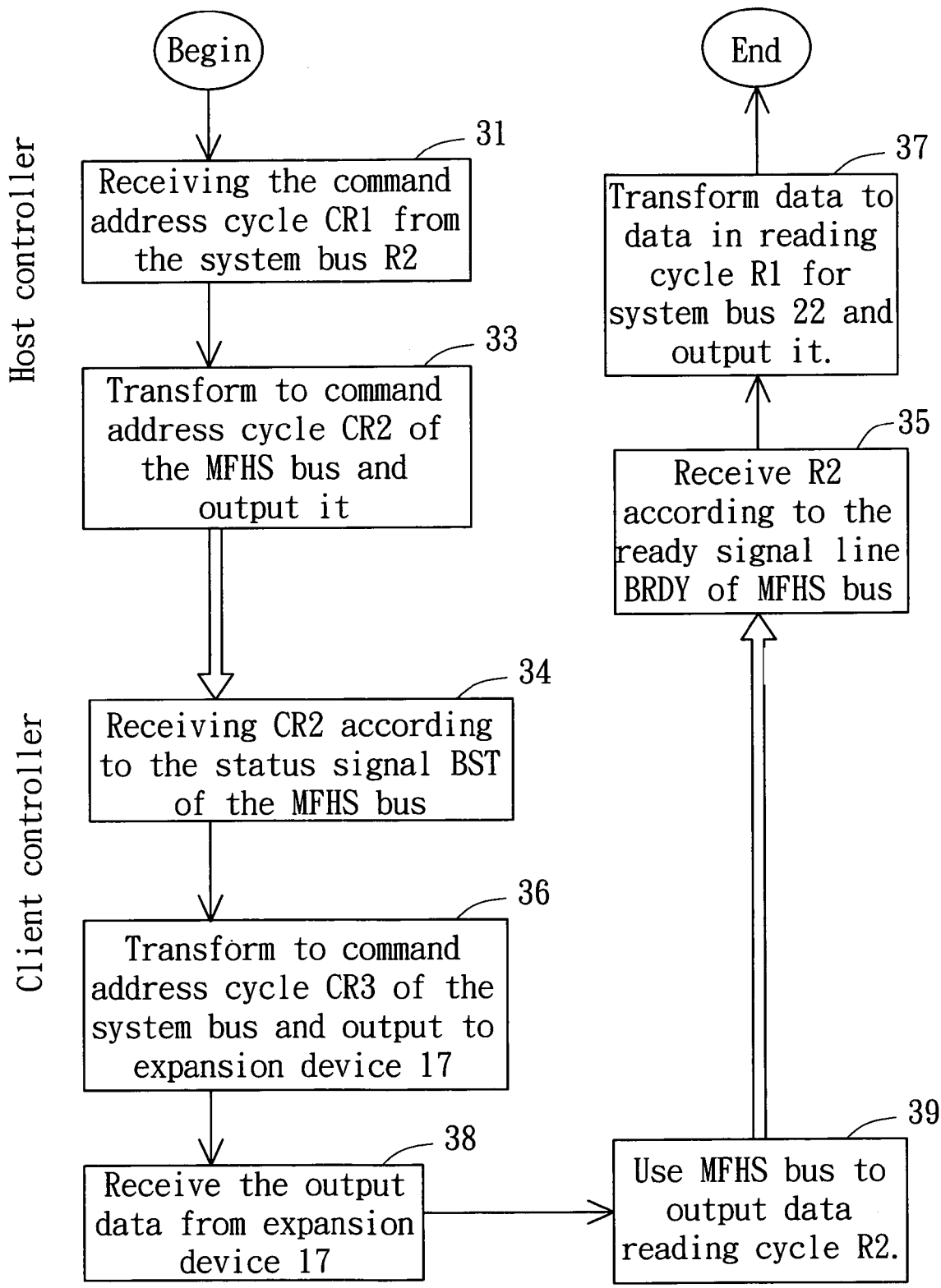
FIG. 3 is the flow chart for the reading cycle when the multi-function high speed bus is used.

FIG. 3 is the flow chart for the reading cycle when the MFHS bus is used. In step 31, the host controller 23 receives a command address cycle CR1 from the CPU through the system bus 22. Secondly, the host controller 23 transforms the command address cycle CR1 into a command address cycle CR2 of the MFSH bus and outputs to the client controller 25 (step 33). Following that, the client controller 25, acknowledged by an enabled ready signal line BST, starts to receive a command address cycle CR2 (step 34). Then, the client controller 25 transforms the command address cycle CR2 into a command address cycle CR3 of the system bus 14 and outputs the command address cycle CR3 to the expansion device 17 (step 36). Then the client controller 25 receives the data from the expansion device 17 according to the command address cycle CR3 (step 38). The client controller 25 outputs the received data in a data reading cycle R2 of the MFHS bus (step 39). The ready signal line BRDY is then enabled. The host controller 23 receives the data according to the enabled ready signal line BRDY of the MFHS bus. Following that, the host controller 23 outputs the received data in the data reading cycle R1 to the CPU 21 (step 37), and completes the read cycle.

After finishing step 33, the host controller 23 transfers a pause command to the CPU 21 in order to prevent any read cycle or write cycle being transferred before current read cycle is completed. After the host controller 23 confirms that the requested data is received, the pause command is abandoned.

Figure 4:
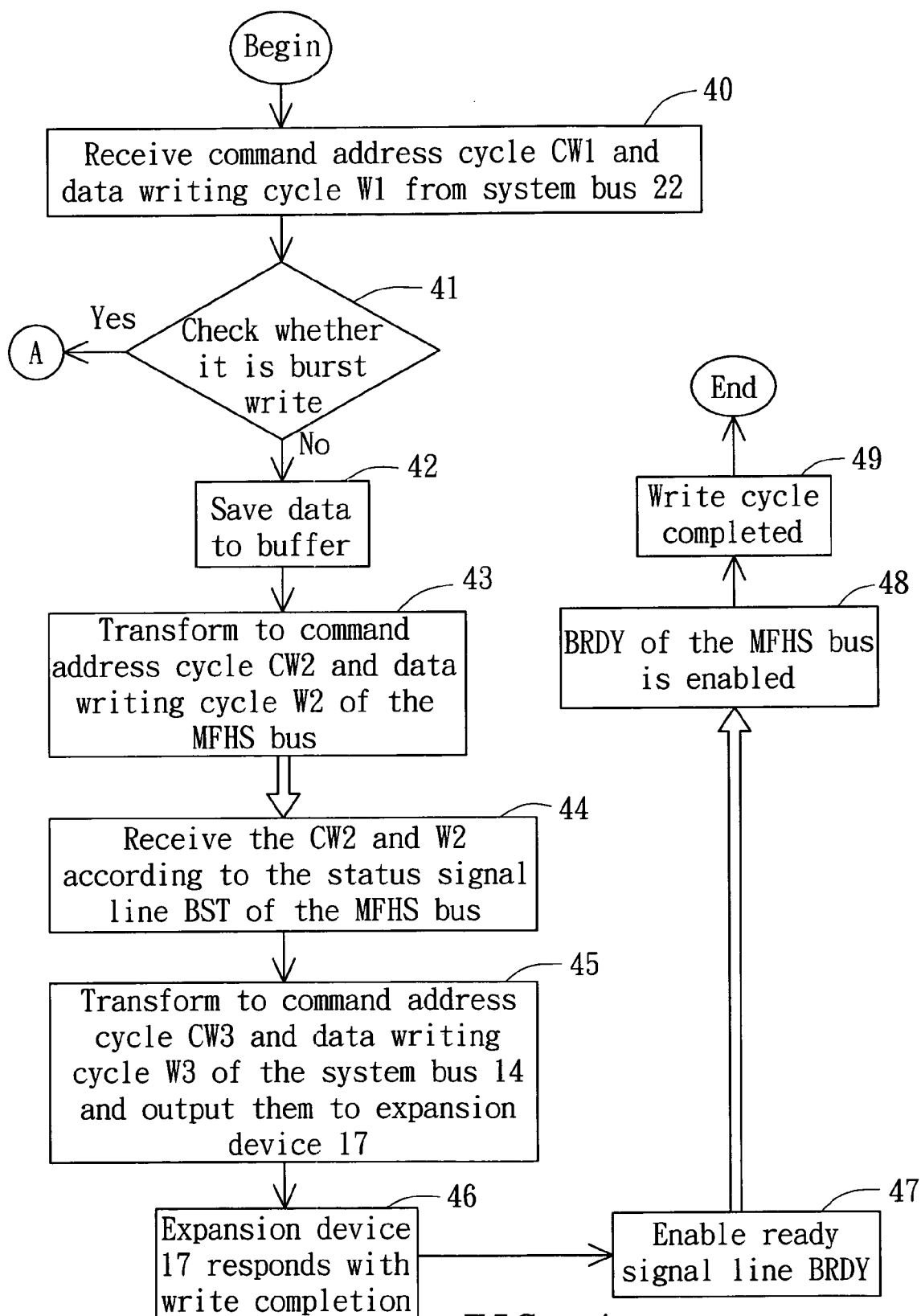
FIG. 4 is the flow chart for the write cycle when the multi-function high speed bus is used.

FIG. 4 is the flow chart for the write cycle when the MFHS bus is used. Firstly, the host controller 23 receives a command address cycle CW1 and a data writing cycle W1 of the writing cycle sent by the CPU 21 through the system bus 22 (step 40). Secondly, the host controller 23 checks whether the command address cycle CW1 is a burst write (step 41). If the command address cycle CW1 is a burst write, then the following step is node A, otherwise the following step is 42. In step 42, the host controller 23 saves the data of the data writing cycle W1 into a buffer. Following that, the host controller 23 transforms both the command address cycle CW1 and the data writing cycle W1 into a command address cycle CW2 and a data writing cycle W2 of the MFHS bus respectively and outputs the command address cycle CW2 and the data writing cycle W2 (step 43). The client controller 25 receives the command address cycle CW2 and the data writing cycle W2 according to the enabled status signal line of the MFHS bus (step 44). After that, the client controller 25 transforms the command address cycle CW2 and the data writing cycle W2 into a command address cycle CW3 and a data writing cycle W3 of the system bus respectively, and outputs the command address cycle CW3 and the data writing cycle W3 to the expansion device 17 (step 45). Following that, after waiting for a period of time, the client controller 25 receives the response signal after the expansion device 17 completes writing status(step 46), and then the ready signal line BRDY of the MFHS bus is enabled (step 47). After the host controller 23 detects that the ready signal line BRDY is enabled (step 48), the write cycle is completed (step 49).

When step 42 is completed, the host controller 23 transmits a pause signal to the CPU 21 in order to prevent another read or write cycle being transferred until the host controller 23 detects that the ready signal line BRDY is enabled.

Figure 5:
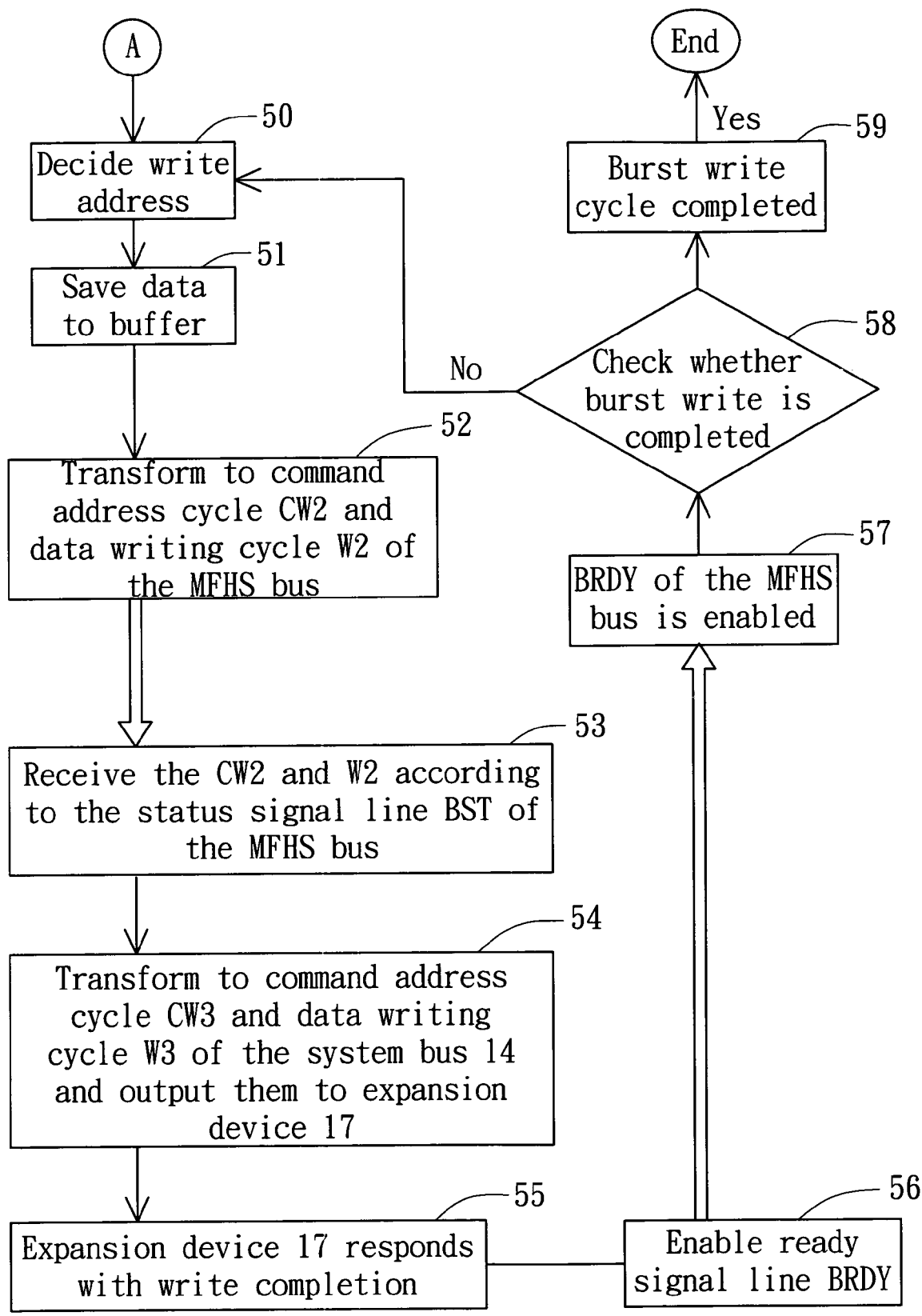
FIG. 5 is the flow chart of the burst write cycle when the multi-function high speed bus is used.

FIG. 5 is the flow chart of the burst write cycle when the MFHS bus is used. For VLIO interface, burst write, in one time, writes data in 4 batches and requires 4 transmissions for the MFHS bus of the invention. Firstly, the host controller 23 decides the write address (step 50). The host controller 23 increases the write address each time until the burst write is completed. Secondly, the data to be written is saved to the buffer (step 51). The host controller 23 then outputs the command address cycle CW2 and the data writing cycle W2 of the MFHS bus to the client controller 25 (step 52). The client controller 25 receives the command address cycle CW2 and the data writing cycle W2 according to the enabled status signal line BST of the MFHS bus(step 53). The client controller 25 transforms the command address cycle CW2 and the data writing cycle W2 into the command address cycle CW3 and data writing cycle W3 of system bus 14 and then outputs the command address cycle CW3 and data writing cycle W3 to the expansion device 17. After a period of waiting time, the client controller 25 receives a response signal for completing the write status from the expansion device 17 (step 55). The client controller 25 enables the ready signal line BRDY of the MFHS bus (step 56). The host controller 23 detects that the ready signal line BRDY is enabled (step 57). The host controller 23 then checks whether the burst write is completed. If the burst write is completed, the burst write cycle is completed otherwise the method returns to step 50, increases the write address, and continues the execution of the write cycle.

After the host controller 23 completes step 51, the host controller 23 transmits a pause signal to the CPU 21 in order to prevent another write or read cycle being transferred until the burst write cycle is completed.

The embodiment of the portable electronic device mentioned above includes at least the following advantages:

The number of pins in the MFHS bus of the portable electronic device is less, therefore the size of the connector can be reduced resulting a smaller expansion pack which fits well with the trend for portable electronic devices to go smaller and lighter.

The portable electronic device is compatible to and therefore can be used with existing expansion devices.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A reading method of a portable electronic device, the portable electronic device including a main electronic apparatus and an expansion pack, wherein the main electronic apparatus includes an MFHS bus, a CPU, and a host controller which is connected to the CPU by a first system bus; the expansion pack includes a client controller; and the MFHS bus includes a clock signal line, a status line, a ready signal line, and a plurality of content signal line, the reading method comprising:

detachably connecting the expansion pack to the main electronic apparatus and connecting an expansion device to the expansion pack so that the main electronic apparatus communicates with the expansion device through the expansion pack, wherein the client controller of the expansion pack communicates with the host controller of the main electronic apparatus through the MFHS bus and communicates with the expansion device by a second system bus;

outputting a first command address cycle from the CPU to the first system bus;
receiving the first command address cycle which is outputted from the first system bus in M clock cycles by the host controller;
transforming the first command address cycle into a second command address cycle by the host controller and transferring the second command address cycle through the MFHS bus in N clock cycle, thereby enabling the status signal line of the MFHS bus, where N>M;
receiving the second command address cycle by the client controller when the status signal line is enabled;
transforming the second command address cycle into a third command address cycle by the client controller; and
transferring the third command address cycle to the expansion device by the second system bus.

2. The reading method according to claim 1, wherein the first command address cycle includes a control signal and an address signal; the control signal includes an access mode signal; and the access mode signal of the control signal represents a read mode.

3. The reading method according to claim 1, wherein when the host controller receives the first command address cycle, the host controller transmits a pause signal to the CPU.

4. The reading method according to claim 1 further comprising:
outputting a data to the second system bus according to the third command address cycle by the expansion device;
receiving the data and transforming the data into a first data reading cycle by the client controller;
transferring the first data reading cycle by the MFHS bus, whereby the ready signal line of the MFHS bus is enabled;
receiving the first data reading cycle according to the enabled ready-signal line of the MFHS bus by the host controller;
transforming the first data reading cycle into a second data reading cycle by the host controller; and
transferring the second data reading cycle to the CPU by the first system bus.

5. The reading method according to claim 4, wherein when the host controller receives the first data reading cycle, the host controller enables the CPU.

6. A writing method of a portable electronic device, the portable electronic device including a main electronic apparatus and an expansion pack, wherein the main electronic apparatus includes an MFHS bus, a CPU, and a host controller which is connected to the CPU by a first system bus; the expansion pack includes a client controller; and the MFHS bus includes a clock signal line, a status line, a ready signal line, and a plurality of content signal line, the writing method comprising:
detachably connecting the expansion pack to the main electronic apparatus and connecting an expansion device to the expansion pack so that the main electronic apparatus communicates with the expansion device through the expansion pack, wherein the client controller of the expansion pack communicates with the host controller of the main electronic apparatus through the MFHS bus and communicates with the expansion device by a second system bus;
outputting a first command address cycle and a first data writing cycle from the CPU to the first system bus;
receiving the first command address cycle and the first writing cycle in M clock cycles by the host controller, where M is a positive integer;
transforming the first command address cycle into a second command address cycle, transforming the first data writing cycle into a second data writing cycle by the host controller, and transferring the second command address cycle and the second data writing cycle to the MFHS bus in N clock cycles, where N is a positive integer and N>M;
receiving the second command address cycle and the second data writing cycle by the client controller when the status signal line is enabled; and
transforming the second command address cycle into a third command address cycle, transforming the second data writing cycle to a third data writing cycle by the client controller, and transferring the third command address cycle and the third data writing cycle through the second system bus.

7. The writing method according to claim 6 further comprising:
writing the data of the third data writing cycle according to the third command address cycle by the expansion device, and responding a write completion signal to the client controller; and
enabling the ready signal line of the MFHS bus according to the write completion signal by the client controller.

8. The writing method according to claim 7 further comprising:
transferring a write cycle completion signal to the CPU according to the enabled ready signal line by the host controller.

9. The writing method according to claim 7, wherein when the host controller receives the first command address cycle and the first data writing cycle, the host controller transmits a pause signal to the CPU.

10. The method according to claim 9, wherein the host controller enables the CPU after the ready signal line is enabled.

11. The method according to claim 8, wherein when the host controller receives the first command address cycle and the first data writing cycle, the host controller checks whether the first command cycle and the first data writing cycle are for a burst write; and if the first command cycle and the first data writing cycle are for a burst write, the writing method is repeated to write the data of the burst write into the expansion device.

12. A writing method of a portable electronic device, the portable electronic device including a main electronic apparatus and an expansion pack wherein, the main electronic apparatus includes an MFHS bus, a CPU, and a host controller which is connected to the CPU by a first system bus; the expansion pack includes a client controller; and the MFHS bus includes a clock signal line, a status line, a ready signal line, and a plurality of content signal line, the writing method comprising:
detachably connecting the expansion pack to the main electronic apparatus and connecting an expansion device to the expansion pack so that the main electronic apparatus communicates with the expansion device through the expansion pack, wherein the client controller of the expansion pack communicates with the host controller of the main electronic apparatus through the MFHS bus and communicates with the expansion device by a second system bus;

outputting a first command address cycle and a first data writing cycle from the CPU to the first system bus, wherein the first command address cycle is a burst write cycle;

receiving the first command address cycle and the first data writing cycle which are outputted from the first system bus in M clock cycles by the host controller, where M is a positive integer;

deciding a write address by the host controller;

transforming the first command address cycle into a second command address cycle according to the write address and transforming the first data writing cycle into a second data writing cycle by the host controller, and outputting the second command address cycle and the second data writing cycle through the MFHS bus in N clock cycles, where N is a positive integer and N>M;

receiving the second command address cycle and the second data writing cycle by the client controller when the status signal line is enabled;

transforming the second command address cycle into a third command address cycle, transforming the second data writing cycle into a third data writing cycle by the client controller, and transferring the third command address cycle and the third data writing cycle through the second system bus;

writing the data of the third data writing cycle according to the third command address cycle by the expansion device, and responding a write completion signal to the client controller;

enabling the ready signal line of the MFHS bus according to the write completion signal by the client controller; and determining whether the burst write cycle is completed by checking the enabled ready signal line by the host controller; and if the burst write cycle being not completed, returning to the step of deciding the write address; if the burst write cycle being completed, the host controller transferring a write cycle completion signal to the CPU.

13. The writing method according to claim 12, wherein when the host controller receives the first command address cycle and the first data writing cycle, the host controller transmits a pause signal to the CPU.

14. The writing method according to claim 13, wherein the host controller enables the CPU after the burst write is completed.

15. A portable electronic device comprising:
a main electronic apparatus comprising:
a central processing unit (CPU);
a first system bus being electrically connected to the CPU and including P signal lines, where P is a positive integer;
a multi-function high speed (MFHS) bus including Q signal lines, where Q is a positive integer and Q<P; and
a host controller for communicating with the CPU through the first system bus and bridging the signals on the P signal lines of the first system bus and the Q signal lines of the MFHS bus, wherein the host controller transfers M clock signals of the first system bus to the MFHS bus in N clock cycles, where N is a positive integer and N>M; and
an expansion pack comprising a client controller, for detachably connecting the main electronic apparatus to an expansion device so that when the expansion device is connected to the expansion pack, the main electronic apparatus communicates with the expansion device through the expansion pack, wherein the client controller of the expansion pack communicates with the host controller of the main electronic apparatus through the MFHS bus and communicates with the expansion device by a second system bus.

16. The portable electronic device according to claim 15, wherein the client controller is used for receiving a command address cycle from the main electronic apparatus and communicating with the expansion device according to the command address cycle, wherein the Q signal lines includes a clock signal line, a status signal line, a ready signal line, and a plurality of content signal line.

17. The portable electronic device according to claim 16, wherein the host controller enables the status signal line of the MFHS bus when the host controller transfers a command address cycle to the client controller; the command address cycle transmits a control signal and an address signal; the control signal includes at least a byte-enabling signal and an access mode signal; and the access mode signal represents a write mode or a read mode.

18. The portable electronic device according to claim 17, wherein when the access mode signal represents a read mode, the client controller transfers a data reading cycle to the host controller according to the expansion device and the ready signal line is enabled.

19. The portable electronic device according to claim 17, wherein when the access mode signal represents a write mode, the client controller enables the ready signal line according to the expansion device in order to indicate the write mode is completed.

20. The portable electronic device according to claim 15, wherein the signal lines of the MFHS bus comprises a clock signal line, a status signal line, a ready signal line, and a plurality of content signal lines; the host controller enables the status signal line of the MFHS bus when the host controller transfers a command address cycle to the client controller; the command address cycle includes a control signal and an address signal; the control signal includes at least a byte-enabling signal and an access mode signal; and the access mode signal represent a write mode or a read mode.

21. The portable electronic device according to claim 15, wherein the signal lines of the MFHS bus comprises a clock signal line, a status signal line, a ready signal line, and a plurality of content signal lines; the host controller enables the status signal line of the MFHS bus when the host controller transfers a command address cycle to the client controller; the command address cycle includes a control signal and an address signal; the control signal includes an access mode signal; and when the access mode signal of the control signal of the command address cycle represents a read mode, the client controller transfers a data writing cycle to the host controller according to the data output from the expansion device and the ready signal line is enabled.

22. The portable electronic device according to claim 15, wherein the signal lines of the MFHS bus comprises a clock signal line, a status signal line, a ready signal line, and a plurality of content signal lines; the host controller enables the status signal line of the MFHS bus when the host controller transfers a command address cycle to the client controller; the command address cycle includes a control signal and an address signal; the control signal includes an access mode signal; and when the access mode signal of the control signal represents a write mode, the client controller enables the ready signal line according to the expansion device in order to indicate the write mode is completed.

23. The portable electronic device according to claim 15, wherein the signal lines of the MFHS bus comprises a clock signal line, a status signal line, a ready signal line, and a plurality of content signal lines; and the client controller communicates with the expansion device through the second system bus which includes R signal lines, where R is a positive integer and R>Q.

24. The portable electronic device according to claim 23, wherein the client controller bridges the signals from the R signal lines of the second system bus and the signals from the Q signal lines of the MFHS bus.

25. The portable electronic device according to claim 23, wherein the first system bus and second system bus are of the same standard.

* * * * *